United States Patent [19]

Takazawa

[11] Patent Number: 5,777,627

[45] Date of Patent: Jul. 7, 1998

[54] OUTLINE CHARACTER DRAWING APPARATUS WITH STEM WIDTH ADJUSTMENT ACCORDING TO USER SPECIFIED BIT-MAP DEVELOPMENT RULES

[75] Inventor: Masahiro Takazawa, Yokohama, Japan

[73] Assignee: Fujitsu Limited, Kawasaki, Japan

[21] Appl. No.: 504,670

[22] Filed: Jul. 20, 1995

[30] Foreign Application Priority Data

Jan. 19, 1995 [JP] Japan ................. 7-006117

[51] Int. Cl.$^6$ ................. G06T 11/00
[52] U.S. Cl. ................. 345/469
[58] Field of Search ................. 395/167–172; 345/141–144, 194, 467–472

[56] References Cited

U.S. PATENT DOCUMENTS

| | | | |
|---|---|---|---|
| 5,050,103 | 9/1991 | Schiller et al. | 395/169 |
| 5,295,240 | 3/1994 | Kajimoto | 395/172 |
| 5,301,267 | 4/1994 | Hassett et al. | 395/169 |
| 5,319,358 | 6/1994 | Martinez et al. | 345/141 |
| 5,398,311 | 3/1995 | Seto | 395/171 |
| 5,526,476 | 6/1996 | Motokado et al. | 395/171 |
| 5,577,170 | 11/1996 | Karow | 395/110 |
| 5,589,851 | 12/1996 | Valdes et al. | 345/136 |
| 5,598,520 | 1/1997 | Harel et al. | 395/169 |
| 5,623,584 | 4/1997 | Kurumida | 395/110 |
| 5,633,991 | 5/1997 | Hakaridani et al. | 395/110 |

FOREIGN PATENT DOCUMENTS

| | | |
|---|---|---|
| 4-188190 | 7/1992 | Japan . |
| 5-11734 | 1/1993 | Japan . |

*Primary Examiner*—Joseph R. Burwell
*Attorney, Agent, or Firm*—Staas & Halsey

[57] ABSTRACT

An outline character drawing apparatus comprising a font dictionary, a path forming unit, a rule storage unit and a bit map developing unit. The font dictionary stores a plurality of outline data for geometrically defining character outlines. The path forming unit forms in a common memory a geometrically expressed graphic path by performing such processes as extracting the data corresponding to each character code sent by a client, transforming the data coordinates into an apparatus coordinate system, adjusting the width of stems making up characters, and approximating curve portions by use of broken lines. The outline data include identifiers representing bit map development rules envisaged at the time of defining the characters in question. The rules are used to develop into bit map format the characters expressed in graphic paths. One such rule stipulates that each pixel be located on a lattice point formed by coordinates. The rule storage unit accommodates a plurality of such development rules together with their identifiers. The bit map developing unit develops outline data into bit map format according to the development rule corresponding to the designated identifier.

8 Claims, 24 Drawing Sheets

FIG.3

| Drawing position moving operator |
|---|
| 0 (X coordinate displacement) |
| 100 (Y coordinate displacement) |

| Segment drawing operator |
|---|
| 50 (X coordinate displacement) |
| 50 (Y coordinate displacement) |

| Horizontal segment drawing operator |
|---|
| 100 (X coordinate displacement) |

| Vertical segment drawing operator |
|---|
| −150 (Y coordinate displacement) |

| Horizontal segment drawing operator |
|---|
| −50 (X coordinate displacement) |

| Start point connection operator |
|---|

| Data end operator |
|---|

| Curve drawing operator |
|---|
| First control point |
| Second control point |
| Third control point |

FIG.15

| Pointer to the next element |
|---|
| Element type = rule of development into bit map format |
| Identifier |

FIG.16

| Pointer to the next element |
|---|
| Element type = curve |
| First control point coordinates |
| Second control point coordinates |
| Third control point coordinates |

FIG.22

| | |
|---|---|
| b1 | X coordinate of outline start point = 10 |
| | X coordinate of outline end point = 20 |
| | Y coordinate of outline = 20 |
| b2 | X coordinate of outline start point = 20 |
| | X coordinate of outline end point = 70 |
| | Y coordinate of outline = 20 |
| | X coordinate of outline start point = 70 |
| | X coordinate of outline end point = 50 |
| | Y coordinate of outline = 50 |
| | X coordinate of outline start point = 50 |
| | X coordinate of outline end point = 10 |
| | Y coordinate of outline = 50 |

FIG.23

| |
|---|
| X coordinate of outline = 10 |
| Y coordinate of outline start point = 50 |
| Y coordinate of outline end point = 40 |
| X coordinate of outline = 10 |
| Y coordinate of outline start point = 40 |
| Y coordinate of outline end point = 20 |
| X coordinate of outline = 70 |
| Y coordinate of outline start point = 20 |
| Y coordinate of outline end point = 50 |

FIG.25

| X coordinate of outline end point = 70 |
|---|
| Y coordinate of outline end point = 20 |
| X coordinate of outline end point = 10 |
| Y coordinate of outline end point = 50 |

FIG.26

| X coordinate of outline end point = 10 |
|---|
| Y coordinate of outline end point = 20 |
| X coordinate of outline end point = 70 |
| Y coordinate of outline end point = 50 |

FIG.28

| Pointer to the next element |
|---|
| Element type = curve |
| First control point coordinates |
| Second control point coordinates |
| Third control point coordinates |
| Shape on start point side |
| Shape on end point side |

(Actual real number stem width:1.5)

(Actual real number stem width:0.5)

(Actual real number stem width: 1.0)

OUTLINE CHARACTER DRAWING APPARATUS WITH STEM WIDTH ADJUSTMENT ACCORDING TO USER SPECIFIED BIT-MAP DEVELOPMENT RULES

BACKGROUND OF THE INVENTION

1. Field of the Invention

The present invention relates to a character drawing apparatus and, more particularly, to an outline character drawing apparatus which includes a font dictionary containing outline data for geometrically defining character outlines, whereby the outline data corresponding to the character codes designated by a client are developed in bit map format for output on a display unit or on a printer.

2. Description of the Related Art

Outline character drawing apparatuses comprise a font dictionary each. The dictionary contains a plurality of outline data for geometrically defining the outline of each of the characters to be drawn when they are output. Each outline data item is composed of a plurality of operators accompanied where necessary by parameters. In operation, the outline character drawing apparatus receives the input of a character code, references the corresponding outline data and, based on the operators of the data, executes a number of processes. Such processes include the transformation of the outline data from a character coordinate system, i.e., the coordinate system for defining characters, into an apparatus coordinate system in which to actually draw characters; the rounding of character coordinates to integers; and the approximation of character curves by use of broken lines. In so doing, the apparatus develops each geometrically expressed character into bit map format according to a predetermined rule of development for output on a display unit or the like.

The rule of character development into bit map format stipulates that each pixel be located on a lattice point formed by the appropriate coordinates, or that each pixel be interposed between the appropriate coordinates. Conventional outline character drawing apparatuses adopt one such rule and use it as the fixed yardstick by which to develop all outline data into bit map format.

When a character is drawn following the above-mentioned coordinate system transformation, the horizontal and/or vertical stem of that character may become misaligned. The "stem" refers to that part of each character which is composed of a portion of its outline and of the opposite portion thereof. A horizontal stem is one which is in parallel with the X axis; a vertical stem parallels the Y axis. In case a stem is misaligned, one of the outline portions making up the stem is moved to adjust the stem width (i.e., width between the outline portions constituting the stem). Following the stem width adjustment, the outline portion of the curve continuous with the outline portion moved for the adjustment is also adjusted.

One disadvantage of the above conventional scheme is low quality of drawn characters, a characteristic attributable to the fact that the rule of character development into bit map format is nonflexible. Another disadvantage is that, with the stem width adjusted following the approximation of a curve using broken lines, the amount of calculations involved with the adjustment is enormous and the processing is slow. Such deficiencies are particularly pronounced with characters composed of many curves, with characters that are slightly tilted, and with characters whose output size is small.

SUMMARY OF THE INVENTION

It is therefore an object of the present invention to provide an outline character drawing apparatus that improves the quality of drawn characters.

It is another object of the invention to provide an outline character drawing apparatus that performs its processing at high speed.

In accordance with an aspect of the present invention, there is provided an outline character drawing apparatus comprising dictionary storage means for storing a plurality of outline data including a plurality of path forming operators and a development rule operator. The path forming operators geometrically define characters to be drawn, and the development rule operator has as a parameter an identifier for designating a development rule by which to develop geometrically expressed characters into bit map format. The apparatus also includes: rule storage means for storing a plurality of development rules matched with identifiers; coordinate transformation means for transforming the outline data in the dictionary storage means from a character coordinate system for defining characters into an apparatus coordinate system for drawing characters; and bit map development means for extracting from the rule storage means the development rule corresponding to the identifier representing the parameter of the development rule operator included in the outline data. The bit map development means further develops into bit map format the character expressed by the data processed by the coordinate transformation means. The developing process is executed in accordance with the development rule extracted from the rule storage means.

In accordance with another aspect of the present invention, there is provided an outline character drawing apparatus comprising: dictionary storage means for storing a plurality of outline data including a linear drawing operator for geometrically defining characters and a curve drawing operator having a plurality of control points as parameters; coordinate transformation means for transforming the outline data in the dictionary storage means from a character coordinate system for defining characters into an apparatus coordinate system for drawing characters; stem width adjustment means for moving the coordinates, in the apparatus coordinate system, of one of a pair of outline portions constituting a stem which is part of a character in order to adjust the width of the stem. The stem width adjustment means further moves the control points, in the apparatus coordinate system, of a curve portion continuous with the outline portion moved for stem width adjustment. The apparatus also includes broken line approximation means for generating a curve approximated in broken lines based on the control points moved by the stem width adjustment means.

The dictionary storage means of the outline character drawing apparatus according to the invention stores outline data including a newly furnished development rule operator for selecting a development rule used to develop character data into bit map format. That is, each character is developed into bit map format according to the rule conceived at the time of defining that character as outline data. This leads to a significant improvement in the quality of drawn characters.

In addition, the control points of the curve portion continuous with the outline portion moved for stem width adjustment are also moved in keeping with the amount in which that outline portion is moved. The process of control point movement is followed by the process of broken line approximation. This reduces the amount of data to be processed, whereby the speed of the processing is enhanced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a view showing an example of outline data;

FIG. 15 is a view showing a path element of a development rule;

FIG. 16 is a view showing a curve path element of a graphic path;

FIG. 22 is a view showing horizontal outline data;

FIG. 23 is a view showing vertical outline data;

FIG. 25 is a view showing improved horizontal outline data;

FIG. 26 is a view showing improved vertical outline data;

FIG. 28 is a view showing a shaped curve path element;

DESCRIPTION OF THE PREFERRED EMBODIMENTS

Figure 1:
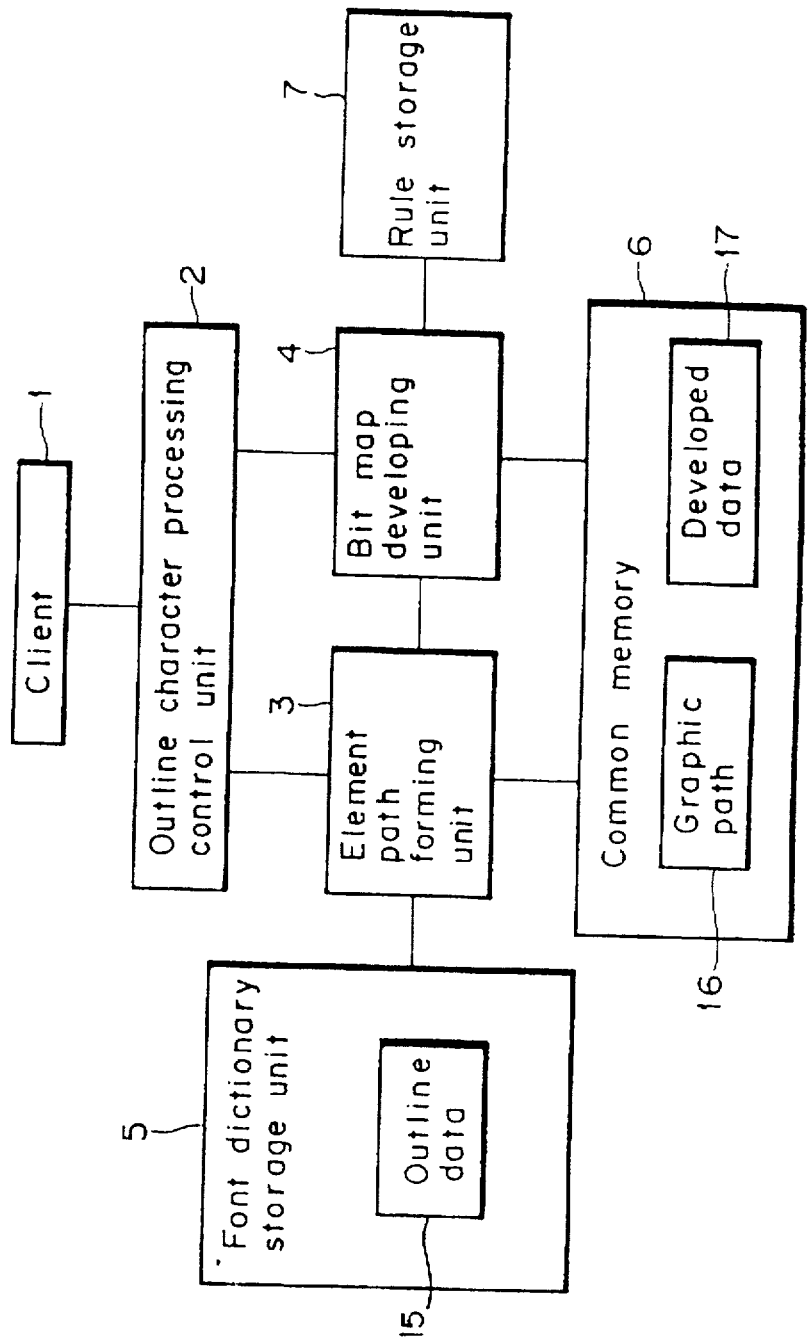
FIG. 1 is a block diagram showing the overall structure of an outline character drawing apparatus practiced as a preferred embodiment of the invention.
Figure 2:
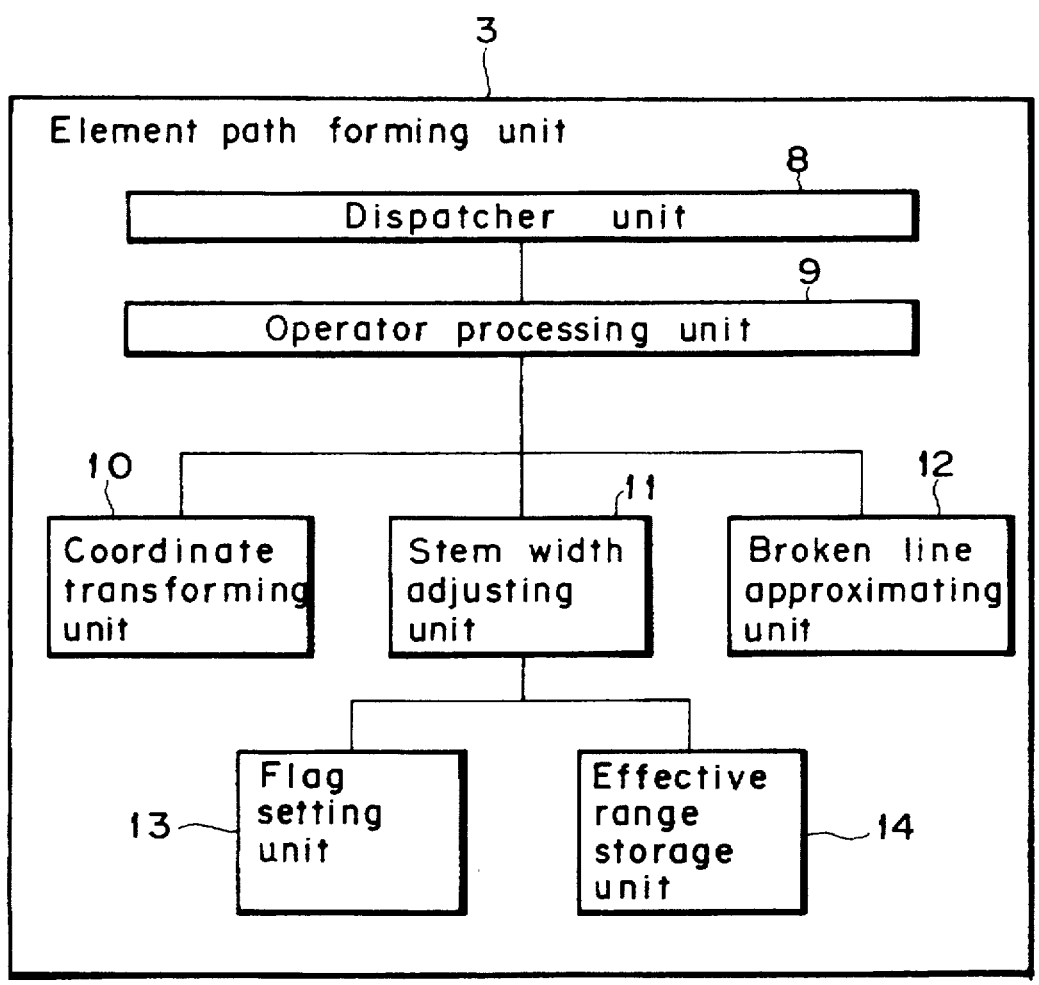
FIG. 2 is a block diagram showing a partial structure of the embodiment.

FIG. 1 is a block diagram showing the overall structure of an outline character drawing apparatus practiced as one preferred embodiment of the invention. In FIG. 1, reference numeral 1 represents a client such as an application program that requests the outline character drawing apparatus embodying the invention to draw characters. This embodiment comprises an outline character processing control unit 2, an element path forming unit 3, a bit map developing unit (bit map development means) 4, a font dictionary storage unit (dictionary storage means) 5, a common memory 6, and a rule storage unit (rule storage means) 7. As illustrated in FIG. 2, the element path forming unit 3 includes a dispatcher unit 8, an operator processing unit 9, a coordinate transforming unit (coordinate transformation means) 10, a stem width adjusting unit (stem width adjustment means) 11, a broken line approximating unit (broken line approximation means) 12, a flag setting unit (flag setting means) 13, and an effective range storage unit (effective range storage means) 14.

The client 1 transmits to the outline character drawing unit the character code of each character to be drawn, the position in which to draw the character, and the format in which to output the character (solid, white-on-black character print, hatch, etc.). These data are sent to the outline character processing control unit 2. Using the received data, the outline character processing control unit 2 controls the outline character drawing apparatus as a whole. Each character code from the client 1 is converted to a pointer pointing to the corresponding outline data in the font dictionary storage unit 5. The character drawing position and the pointer are forwarded to the element path forming unit 3.

Figure 4:
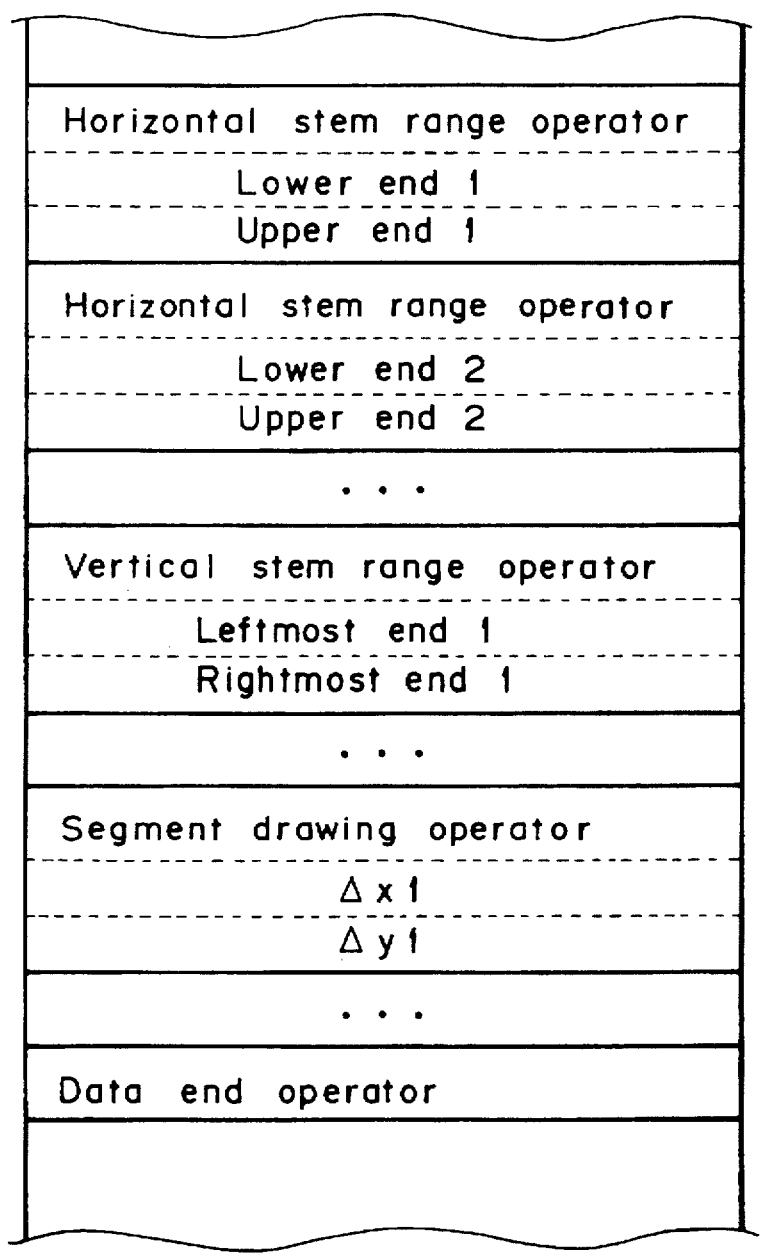
FIG. 4 is a view showing another example of outline data.

The font dictionary storage unit 5 stores a plurality of outline data 15 for geometrically defining the outline of each character to be drawn. The outline data 15 illustratively comprise a number of operators shown in FIGS. 3 through 5. An operator is either an instruction for generating a character outline as a figure, or an instruction for designating a specific process in drawing a character.

Figures 5, 6:
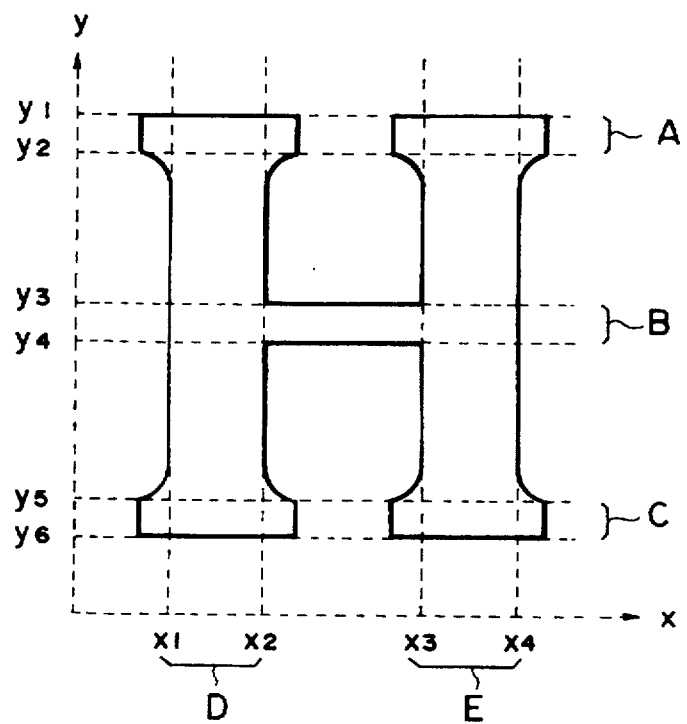
FIG. 5 is a view showing a further example of outline data.
FIG. 6 is a view for explaining stem ranges.

As shown in FIG. 3, the operators include figure drawing operators having coordinate displacements, such as a drawing position moving operator, a segment drawing operator, a horizontal segment drawing operator and a vertical segment drawing operator. The operators also include path forming operators such as a start point connection operator and an end operator. Furthermore, as depicted illustratively in FIG. 4, there are hint operators such as a horizontal and a vertical stem range operator (a horizontal stem has the Y coordinates of its upper and lower ends designated, and a vertical stem has the X coordinates of its leftmost and rightmost ends designated, by hint operators). In addition, as shown in FIG. 5, there is a curve drawing operator having coordinate displacements involving a first through a third control point.

The start point connection operator has no parameter. Outline data are terminated by an end operator indicating the end of the data. The outline data are generated in a coordinate system in which characters were initially defined (this system is called the character coordinate system hereunder). A stem is a part of a character formed by an outline portion and by another outline portion opposite thereto. A horizontal stem is a stem in parallel with the X axis; a vertical stem is a stem paralleling the Y axis.

Below is a detailed description of the stem range operators as hint parameters. For example, the character shown in FIG. 6 has a horizontal stem A whose range is defined by an upper end coordinate y1 and a lower end coordinate y2. Horizontal stems B and C as well as vertical stems D and E constituting the character have their ranges defined in like manner. With the stem A, an outline portion passing through the coordinate y1 and located on a straight line in parallel with the X axis is paired with another outline portion passing through the coordinate y2 and located on another straight line paralleling the X axis. This pair of outline portions constitutes the stem A.

Figure 7:
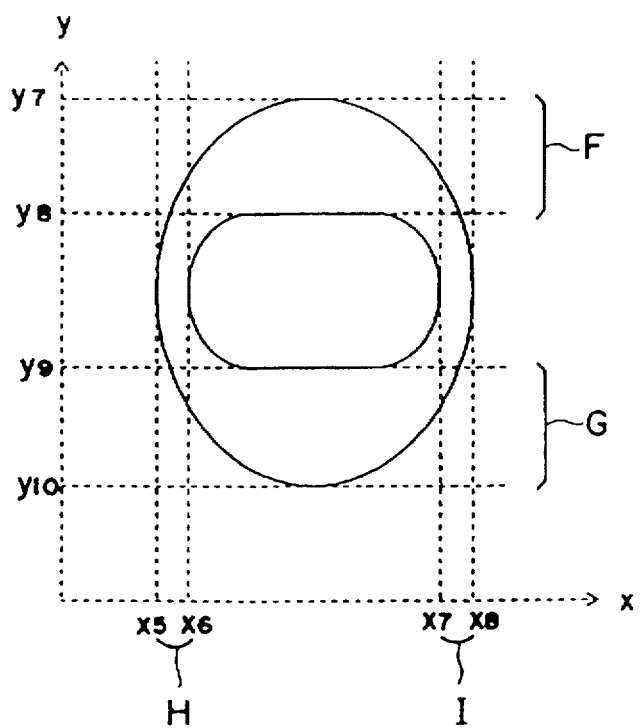
FIG. 7 is another view for explaining stem ranges.

With the character shown in FIG. 7, a vertical stem H has its range defined by the leftmost coordinate x5 and by the rightmost coordinate x6. Horizontal stems F and G as well as a vertical stem I of the character also have their ranges defined in like manner. In the case of the stem H, an outline portion passing through the coordinate x5 and located on a straight line in parallel with the Y axis is paired with another outline portion passing through the coordinate x6 and located on another straight line paralleling the Y axis. This pair of outline portions constitutes the stem H. If any outline portion that constitutes part of a stem is a curve having four control points (including a current point), at least one of the start and end control points must be located on a stem range boundary (e.g., the straight line passing through the coordinate x5 and paralleling the Y axis in FIG. 7).

In FIGS. 1 and 2, the operator processing unit 9 in the element path forming unit 3 processes various operators to generate a graphic path. The dispatcher unit 8 references the font dictionary storage unit 5 to detect the operators of the outline data 15 corresponding to the pointer sent from the outline character processing control unit 2. Processing of each operator is assigned to the appropriate operator processing unit 9.

The coordinate transforming unit 10 in the element path forming unit 3 carries out coordinate transformation processes, such as the transformation of coordinates from the character coordinate system into the apparatus coordinate system, and the transformation of relative coordinates into absolute coordinates. The stem width adjusting unit 11 moves one of the pair of outline portions constituting each stem in order to adjust stem width misalignment.

The broken line approximating unit 12 calculates a continuous curve by approximating a plurality of control points with a predetermined curve, the calculated curve being converted to data expressed in broken lines as a set of small straight line segments. The predetermined curve for approximation purposes may illustratively be the Bezier curve having four control points composed of the current point (i.e., currently drawing position) and three points given by curve drawing operator parameters.

Figure 8:
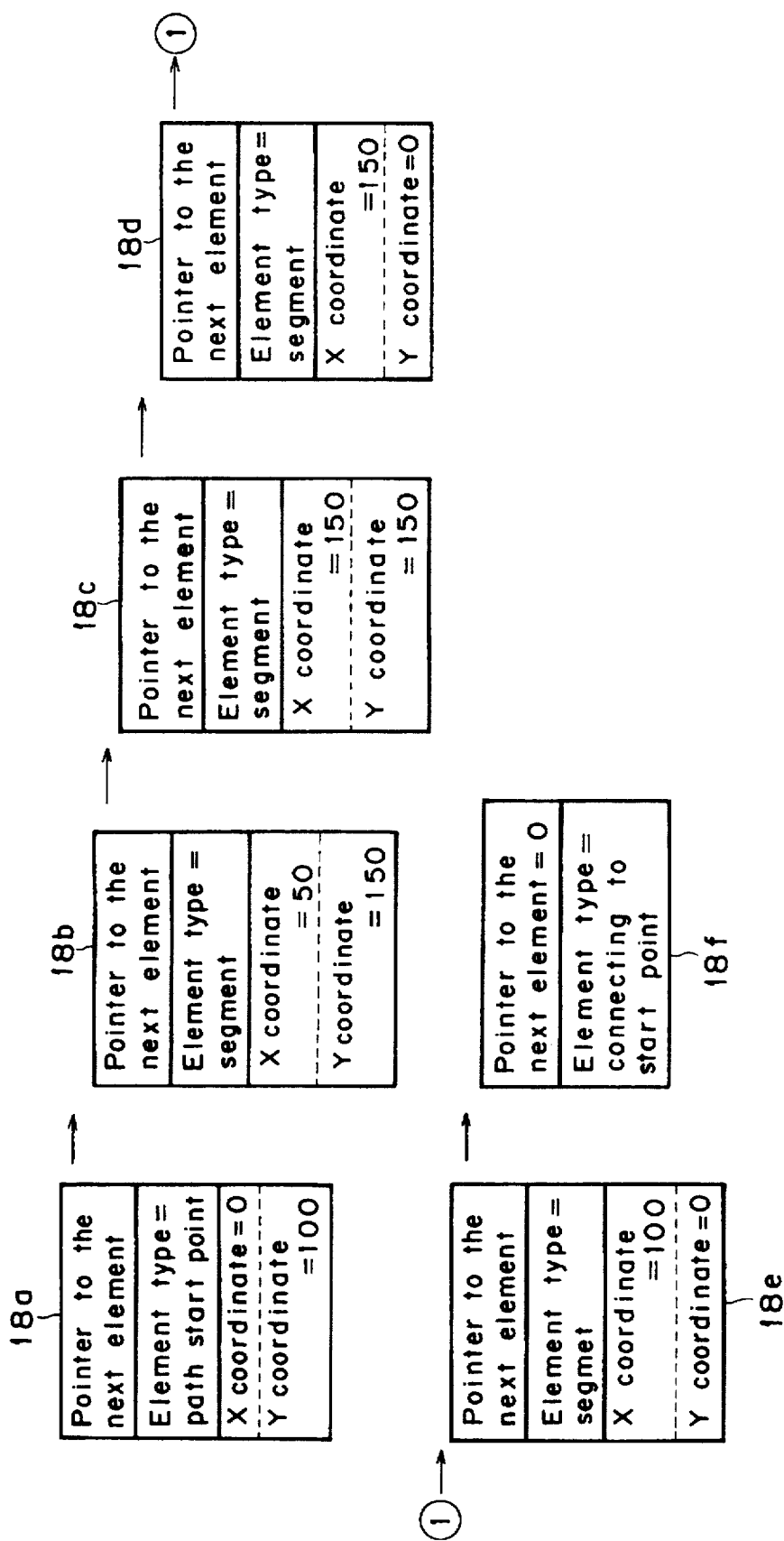
FIG. 8 is a view showing a typical graphic path.

The operator processing unit 9 generates a graphic path 16 in concert with the coordinate transforming unit 10, stem width adjusting unit 11 and broken line approximating unit 12. The generated graphic path 16 is placed in the common memory 6 (used commonly by the element path forming unit 3 and bit map developing unit 4). The graphic path 16 is composed illustratively of a plurality of path elements 18a through 18f, as shown in FIG. 8. Each path element 18 is data made of such parameters as a pointer pointing to the storage location of the next path element, the element type, and X and Y coordinates where needed.

Figure 9:
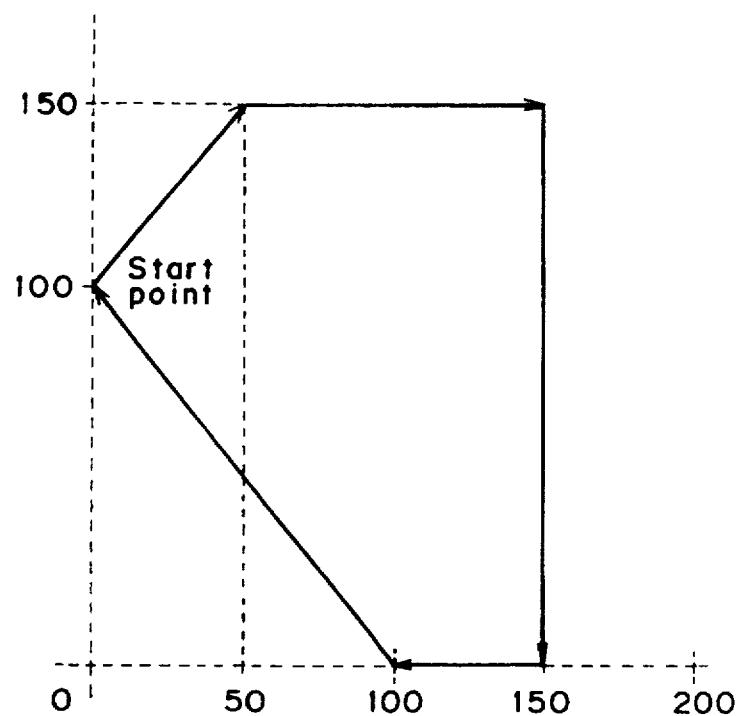
FIG. 9 is a view for explaining the meaning of the graphic path example in FIG. 8.

FIG. 8 shows the graphic path furnished through processing based on the outline data in FIG. 3. For purpose of simplification, the process of coordinate transformation in FIG. 8 is only that of transforming relative coordinates into absolute coordinates, not that of transformation from the character coordinate system to the apparatus coordinate system. The meaning of the graphic path shown in FIG. 8 will now be described with reference to FIG. 9. The first path element 18a indicates that the start point is defined by coordinates (x, y)=(0, 100). The next path element 18b designates that a segment is to be drawn from coordinates (0, 100) of the preceding path element 18a to coordinates (50, 150). The drawing of segments making up the path proceeds in like manner, until the last path element 18f is reached. The element 18f designates that a segment is to be drawn from coordinates (100, 0) of the preceding path element 18e to the coordinates of the first path element 18a. In practice, however, the outline data as they are converted to the apparatus coordinate system constitute each character to be drawn. Thus the shape of a character defined in the character coordinate system does not necessarily coincide with the result of the drawing.

Referring to FIG. 1, upon completion of the graphic path 16, the element path forming unit 3 notifies the outline character processing control unit 2 thereof. In response, the outline character processing control unit 2 sends the output format designated by the client 1 to the bit map developing unit 4. The bit map developing unit 4 generates developed data 17 by developing into bit map format each character expressed using the graphic path 16 within the common memory 6. The developing process is carried out in accordance with an appropriate development rule. The developed data, expressed in pixels, is placed into the common memory 6. The outline character processing control unit 2 receives a drawing order from the client 1 and, based on the developed data 17, outputs the corresponding character onto an appropriate device such as a display unit.

The outline data 15 held in the font dictionary storage unit 5 represent characters whose size is greater (e.g., 1,000×1, 000 dots) than the expected size of characters to be drawn. The larger character size is intended to allow the details of each character to be defined precisely. Components of a transformation matrix that permits mapping from the character coordinate system to the apparatus coordinate system may or may not be an integer each (e.g., 1.5%). Because individual outline data are often designated in the form of a relative vector (i.e., coordinate displacement), errors can accumulate during transformation from the character coordinate system to the apparatus coordinate system. Thus even if the outline data 15 held in the font dictionary storage unit 5 are all composed of integer coordinates, they do not necessarily translate into integer coordinates in the apparatus coordinate system.

Whereas individual outline coordinates constituting characters are processed as real numbers (with fixed or floating point) in the apparatus coordinate system, these coordinates (i.e., real numbers) must be made to correspond with pixels (i.e., integers) when each character is developed into bit map format. The correspondence is ensured by use of a development rule and by rounding rules that reckon each real number as an integer.

One development rule stipulates that each pixel is to be located on a lattice point formed by coordinates (called the development rule 1 hereunder); another designates that each pixel is to be located between coordinates (called the development rule 2 hereunder). One rounding rule requires that fractions be discarded; another rule specifies that fractions be raised to a unit; another rule rounds each real number to the nearest whole number; yet another rule designates that fractions be reckoned in a predetermined manner followed by addition of an integer to the rounded result. These rules are stored in the rule storage unit 7.

Where real numbers are rounded to integers and developed in bit map format, what often occurs is the misalignment of stem widths that should be of an identical size for each character. In view of display quality, what matters in particular is a pronounced misalignment between widths of a horizontal stem or a vertical stem.

Figure 10:
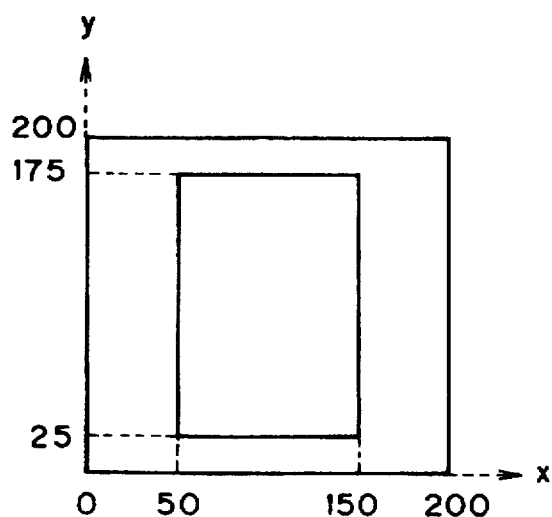
FIG. 10 is a view showing a character in a character coordinate system.
Figure 11:
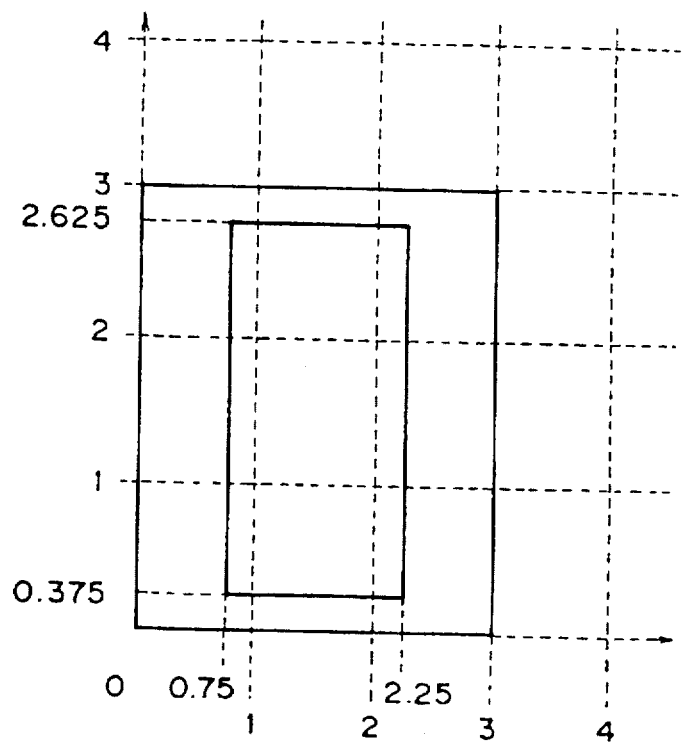
FIG. 11 is a view showing a character in an apparatus coordinate system.
Figure 12:
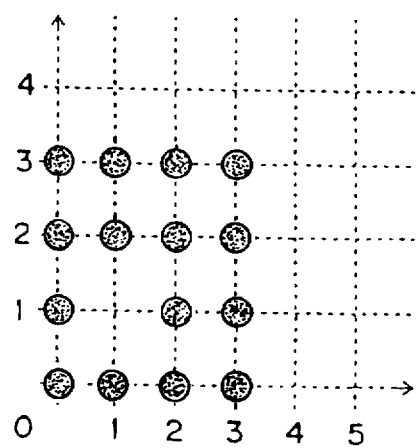
FIG. 12 is a view showing the result of developing outline data into bit map format by the development rule 1.
Figure 13:
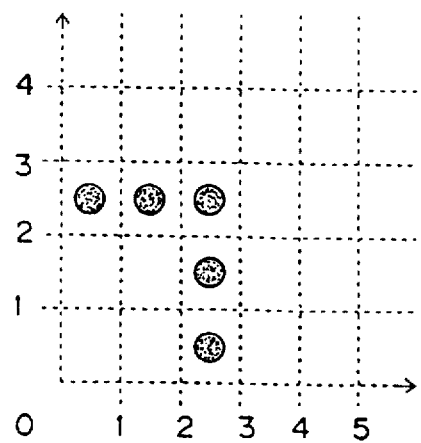
FIG. 13 is a view showing the result of developing outline data into bit map format by the development rule 2.

For example, suppose that the character in FIG. 10 in the character coordinate system is reduced in size to 1.5% of the initially defined size, forming the character in FIG. 11 in the apparatus coordinate system. Also suppose that the character coordinates in FIG. 11 have their fractions discarded before being developed as per the development rule 1 into what is shown in FIG. 12, or as per the development rule 2 into what is shown in FIG. 13. Where the development rule 1 is used for coordinate development, as depicted in FIG. 12, the upper horizontal stem is widened and the lower horizontal stem narrowed, and the left-hand side vertical stem is narrowed and the right-hand side vertical stem widened. Where the development rule 2 is employed for coordinate development as in the case of FIG. 13, the left-hand side vertical stem and the lower horizontal stem have disappeared.

Such deficiencies are corrected by use of the above-mentioned hint operators that define horizontal and vertical stem ranges. A pair of outline portions constituting each horizontal and vertical stem is extracted by referring to suitable outline data hint operators. During development of character coordinates into bit map format, the integer width of each stem is compared with its target width. If the two widths fail to match, the actual stem width is adjusted to align with the target stem width. The processing of stem width adjustment will be discussed later.

Major features of the preferred embodiment of the invention will now be described in detail.

(1) Development Rule Operator

Conventionally, the rule of developing characters into bit map format is dependent on the character drawing apparatus in use. This means that the development rule conceived at the time of defining outline data representing characters does not necessary match the rule for later developing the outline data into bit map format. Characters may appear distorted when actually drawn on the output device.

Figure 14:
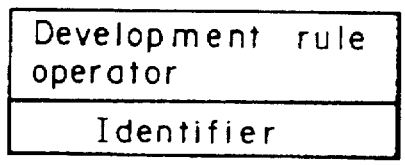
FIG. 14 is a view showing a development rule operator.

Such degradation in the quality of drawn characters is minimized by use of a newly conceived development rule operator. The operator has as its parameter an identifier for designating a development rule by which to develop geometrically expressed characters into bit map format. The rule storage unit 7 accommodates a plurality of development rules matched with their identifiers. The bit map developing unit 4 extracts from the rule storage unit 7 the development rule corresponding to the identifier that serves as the parameter of the development rule operator for the outline data in question. Using the extracted development rule, the bit map developing unit 4 develops the outline data into bit map format. It follows that each character is developed into bit map format according to the rule conceived at the time of defining that character as outline data. This results in an appreciable improvement in the quality of drawn characters. FIG. 14 shows a typical development rule operator.

There are illustratively two methods for sending the identifier of the development rule operator to the bit map developing unit 4. By one method, the element path forming unit 3 informs the outline character processing control unit 2 of both the completion of the graphic path 16 and the identifier in question. In turn, the outline character processing unit 2 sends the identifier to the bit map developing unit 4. By another method, the identifier is added to the graphic path 16 as one of the path elements, as show in FIG. 15. Meanwhile, it is possible to include the rounding rule mentioned earlier as part of the development rule so that the rounding rule may also be designated using the development rule operator.

(2) Width Adjustment of Curved Stem

Where a stem whose width is to be adjusted is curved, the curve is approximated conventionally using broken lines before the stem width is adjusted. In practice, it takes quite complicated processing to let the broken lines obtained by approximating the original curve reflect the subtle effects of width adjustment on the curve shape so as not to distort the character shape. Thus characters with many curves tend to be drawn slowly.

The embodiment of the invention corrects this deficiency as follows: where outline data comprise a curve drawing operator, the control points of the curve continuous with the outline portion previously moved for stem width adjustment are moved in keeping with the amount in which that outline portion is moved. Thereafter, broken line approximation is conducted. Because only the control points need to be adjusted regarding the curve, the processing involved is simplified and the speed of the processing is enhanced.

More specifically, a curve path element such as one shown in FIG. 16 is initially created as a graphic path element corresponding to the curve drawing operator. With no broken line approximation executed, a graphic path containing the curve path element is prepared. When the processing of stem width adjustment is carried out at this stage, the control points of the curve continuous with the moved outline portion are moved by the same amount in which that outline portion was moved.

Figure 17:
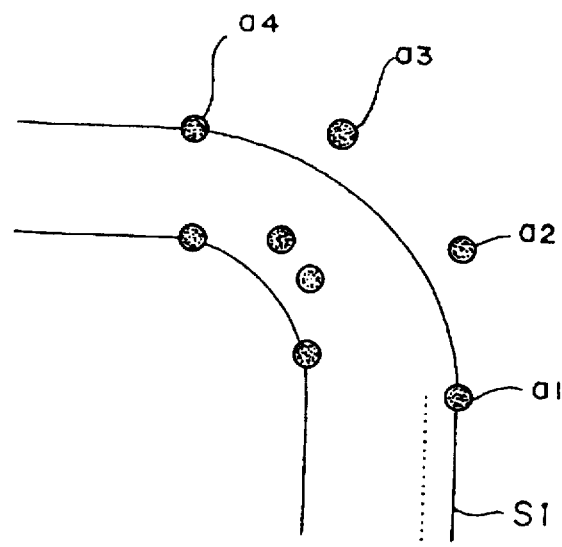
FIG. 17 is a view for explaining how control points are to be adjusted (before adjustment)
Figure 18:
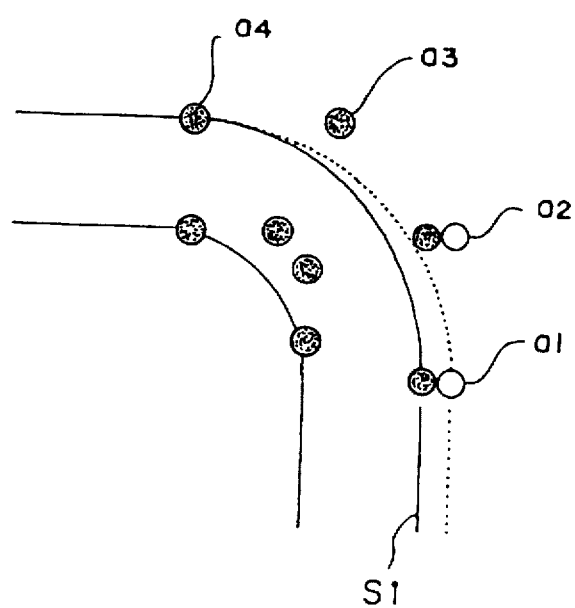
FIG. 18 is a view for explaining how control points are adjusted (after adjustment)

In the character portion shown in FIG. 17, solid black circles a1 through a4 are control points. Now suppose that an outline portion S1 on the right-hand side of the vertical stem is moved to the left. The result after the movement is depicted in FIG. 18. In FIG. 18, hollow circles represent the corresponding control points in effect before the movement. In this example, the moved control points are the points a1 and a2 associated with the outline portion S1, while the points a3 and a4 remain stationary. Thereafter, broken line approximation is performed on the basis of the curve path element in effect, thus causing the curve path element of the graphic path in question to be replaced by a plurality of segment path elements acquired through the broken line approximation.

(3) Width Adjustment of Stem Tilted by Rotation

Generally, the transformation of coordinates from the character coordinate system to the apparatus coordinate system does not necessarily leave horizontal stems horizontal or vertical stems vertical. It often happens that the horizontal or vertical stem is tilted as a result of the transformation. Conventionally, stem width adjustment is applicable only to such varieties of transformation as parallel translation, scaling, mirroring and 90-degree multiple rotation from the character coordinate system to the apparatus coordinate system, i.e., on condition that the stems remain horizontal or vertical after the transformation. If a horizontal or vertical stem in the character coordinate system appears tilted following transformation into the apparatus coordinate system, width adjustment is not available for that stem. This means a lower degree of freedom in carrying out the coordinate transformation and leads to a reduced quality of drawn characters.

Conventionally, the target stem width for use in stem width adjustment is prepared as follows: the stem range of a hint operator is first transformed into the apparatus coordinate system. On the basis of the stem range thus acquired, the outline portions constituting the stem are extracted (i.e., designated) in the apparatus coordinate system. The width size between the two outline portions is obtained in the apparatus coordinate system and rounded to an integer for use as the target stem width. Because only horizontal or vertical stems are subject to stem width adjustment in the conventional setup, it is easy to designate each stem to be adjusted, for which the target stem width is simply the difference between Y coordinates (for a horizontal stem) or between X coordinates (for a vertical stem). But this is not the case with tilted stems in the apparatus coordinate system; it takes complicated processing to designate such stems and calculate their widths.

This bottleneck is circumvented as follows: on the basis of the stem range in a hint operator included in the outline data representing a character, a pair of outline portions constituting a stem that forms part of that character are first extracted in the character coordinate system. The coordinates of the outline portions constituting the stem are transformed from the character coordinate system to the apparatus coordinate system. The transformed coordinates are rounded to integers. The width formed between the rounded coordinates and perpendicular to the outline portions is developed into bit map format according to a predetermined development rule. The width is expressed in a pixel count based on the bit map format and regarded as an actual integer stem width. Meanwhile, the width which is formed in the character coordinate system between the coordinates of the outline portions constituting the stem and which is perpendicular to the outline portions is transformed into the apparatus coordinate system. The transformed width is rounded to an integer and regarded as a target stem width. The difference between the actual integer stem width and the target stem width is taken as a first correction value. In accordance with the first correction value, the coordinates of one of the pair of outline portions constituting the stem is moved in the apparatus coordinate system, whereby the width of the stem is adjusted.

In moving an outline portion, the X and Y coordinates of that portion are corrected in the apparatus coordinate system on the basis of the X and Y direction components constituting the first correction value within that system.

According to the invention, the outline portions constituting each stem are extracted in the character coordinate system. This makes it easy to extract and designate any stem that is tilted after transformation into the coordinate system. There is no possibility of accumulated errors hampering the proper extraction of outline portions. With the invention, the stem width in the character coordinate system is transformed into the apparatus coordinate system for use as a target stem width. Thus there is no need to perform such conventional complicated processes as initially drawing a perpendicular from a coordinate point of one of the pair of outline portions to the other outline portion, finding the point of intersection of the perpendicular with the latter outline portion, and calculating the width between the coordinate point of one outline portion and the point of intersection on the other outline portion. With such complicated processing eliminated, the speed of the processing is enhanced.

(4) Measures to Prevent Missing Stems

In the above-described process of stem width adjustment, certain rounding rules can turn the target stem width into 0 upon comparison with the integer stem width. That is, as shown in FIG. 13, a character developed into bit map format may lose some of its stems. Although a scheme could be devised to check if any stem has disappeared, such measures will increase processing loads on the apparatus.

According to the invention, if the target stem width for comparison with an actual stem width turns out to be 0, the target stem width is set forcibly to 1. This measure prevents stems from disappearing without increasing the burden of processing on the apparatus, whereby the quality of drawn characters is improved.

(5) Movement History Flag

It may become necessary to alter the width of a single horizontal or vertical stem midway through the stem length. Such a need is generally met by changing the stem range halfway through the applicable outline data. Conventionally, one of the pair of outline portions constituting a given stem is fixedly determined to be movable. However, attempts to modify the stem width halfway through the stem length can result in defective processing.

Figure 19A:
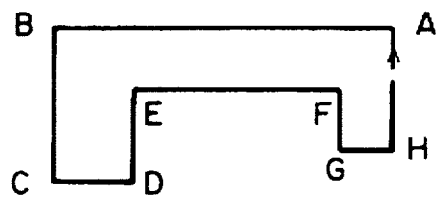
FIGS. 19A through 19D are views for explaining how the stem width is adjusted conventionally.
Figure 19B:
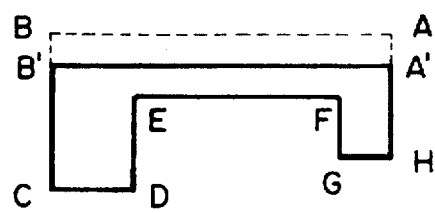

For example, suppose that the upper outline portion of each horizontal stem and the right-hand side outline portion of each vertical stem are set to be moved for stem width adjustment. FIGS. 19A through 19D show an example of conventional stem width adjustment under the above conditions. FIG. 19A depicts the initial shape to be adjusted in width. If the stem width between an outline portion A-B and an outline portion C-D is wider than the target stem width, the outline portion A-B is moved close to the outline portion C-D to form a new outline portion A'-B', as illustrated in FIG. 19B.

Figure 19C:
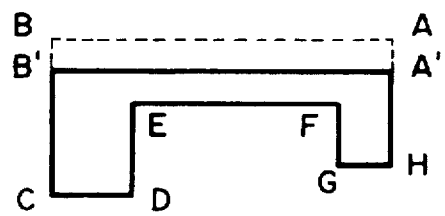
Figure 19D:
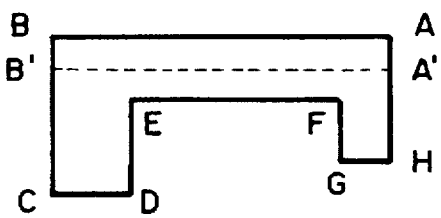

If the stem width between the outline portion A'-B' and an outline portion E-F is the same as the target stem width, no adjustment is conducted, as shown in FIG. 19C. Then if the stem width between the outline portion A'-B' and an outline portion G-H is narrower than the target stem width, the outline portion A'-B' is moved away from the outline portion G-H, to reach the initial outline portion A-B, as depicted in FIG. 19D. As evident from the comparison of FIG. 19A with FIG. 19D, the adjusted shape turns out to be exactly the same as the shape before the adjustment. Such adjustment is simply meaningless.

The embodiment of the invention overcomes the above problem by use of the flag setting unit 13 that sets a flag for each of the outline portions constituting each stem, the flag indicating whether or not the corresponding outline portion has so far been moved for stem width adjustment. The stem width adjusting unit 11 references the flag setting unit 13 to find an outline portion that is yet to be moved and to regard that outline portion as a movable outline portion for the current stage of stem width adjustment. Once any outline portion is moved, the flat setting unit 13 changes the flag of that portion to indicate that the outline portion has been moved.

Figure 20A:
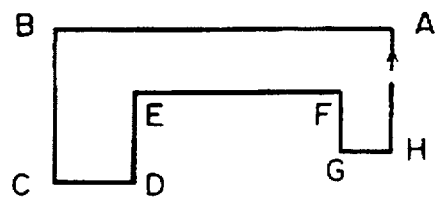
FIGS. 20A through 20D are views for explaining how the stem width is adjusted in an improved manner.

How the flag-related process above is carried out will now be described in more detail with reference to FIGS. 20A through 20D. FIG. 20A shows the initial shape to be adjusted in width. At this stage, no stem width adjustment is performed, and the flags for all outline portions constituting the stem indicate the absence of movement history.

Figure 20B:
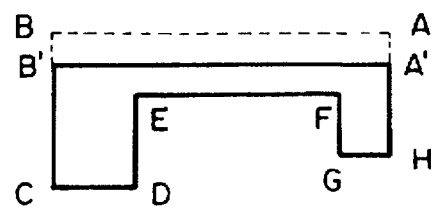

If the stem width between the outline portion A-B and the outline portion C-D is wider than the target stem width, the outline portion A-B is moved close to the outline portion C-D to form the outline portion A'-B', as shown in FIG. 20B. At this point, the movement history flag of the outline A-B (A'-B') is changed to indicate that the outline portion has been moved.

Figure 20C:
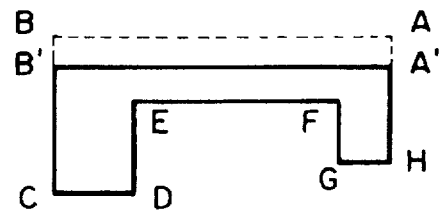

Then if the stem width between the outline portion A'-B' and the outline portion E-F is the same as the target stem width, no adjustment is conducted, as depicted in FIG. 20C. At this point, no movement history flag is changed. Suppose now that the stem width between the outline portion A'-B' and the outline portion G-H is narrower than the target stem width.

Figure 20D:
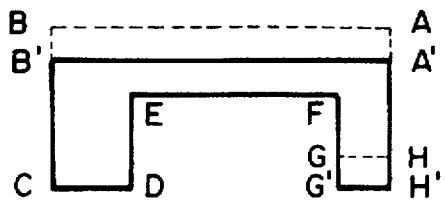

In that case, either the outline portion A'-B' or the outline portion G-H needs to be moved. Since the movement history flag of the outline portion A-B (A'-B') has been changed to indicate the past movement whereas the movement history flag of the outline portion G-H is yet to indicate history of movement, the outline portion G-H is selected to be moved. As shown in FIG. 20D, the outline portion G-H is moved away from the outline portion A'-B' to form a new outline portion G'-H'. As evident from the comparison of FIG. 19D with FIG. 20D, the prior art deficiency of the adjusted shape being identical to the unadjusted shape is now overcome.

(6) Outline Shape

Figure 21:
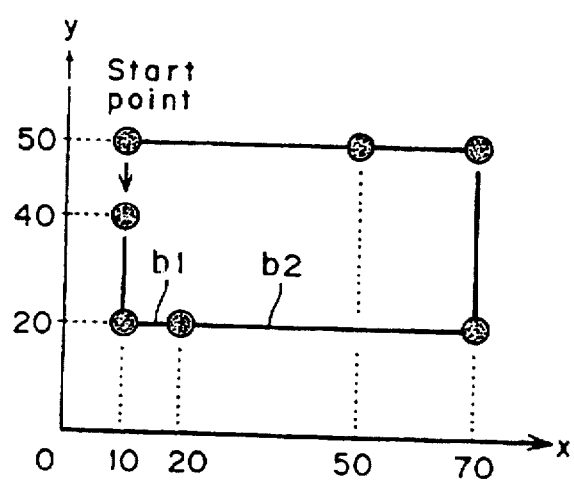
FIG. 21 is a view for explaining outline data.

The stem range of the character in FIG. 21 is represented illustratively by the outline data shown in FIGS. 22 and 23, the data being handled inside the outline character drawing apparatus. As indicated, the outline data comprise a series of coordinates denoting both ends of each of the segments making up the character. FIGS. 22 and 23 show typical horizontal and vertical outline data, respectively.

Figure 24:
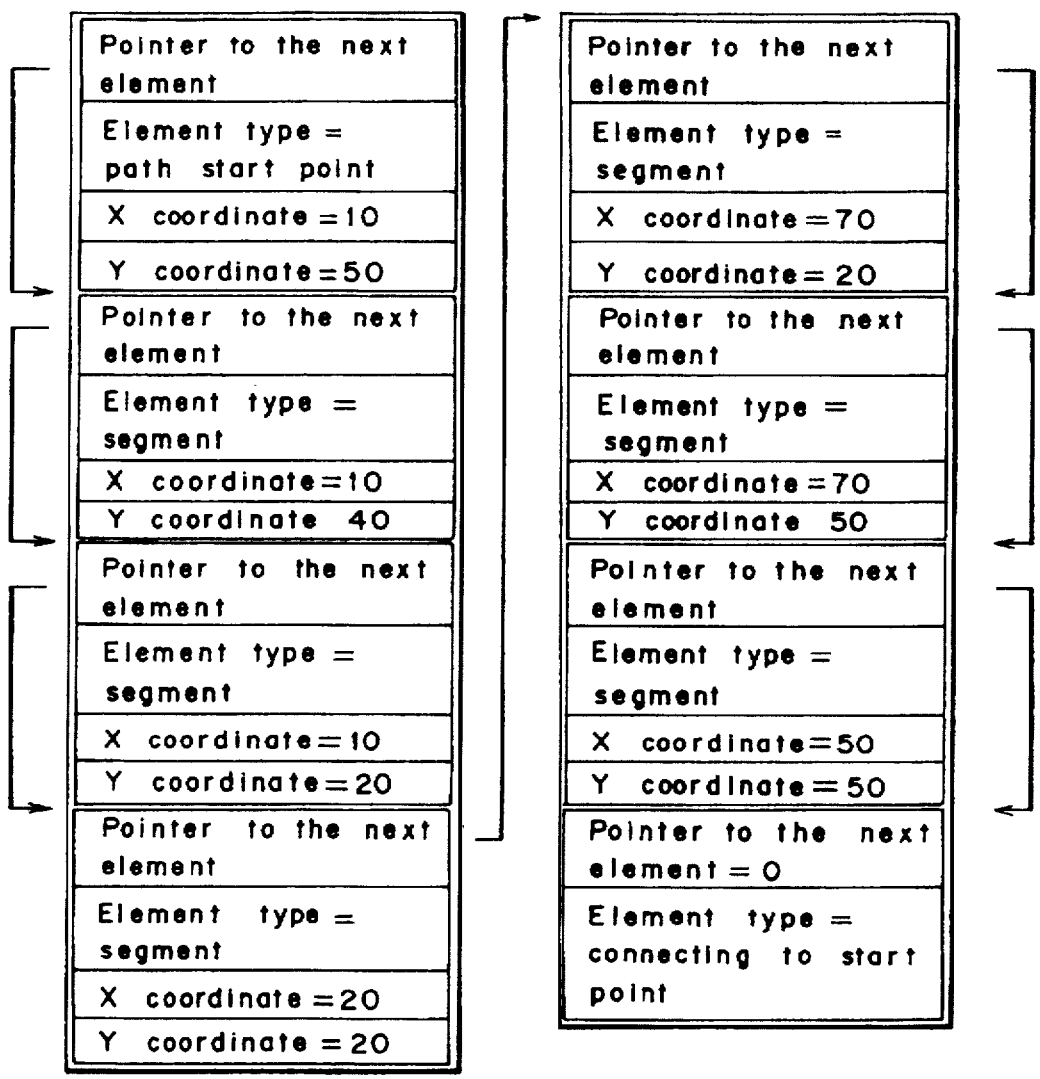
FIG. 24 is a view showing a graphic path.

For example, the outline data representing the outline portion b1 in FIG. 21 are shown in the upper part of FIG. 22 in which the X coordinate of the outline start point=10, the X coordinate of the outline end point=20, and the common Y coordinate=20. Specifically, the outline data indicate that the horizontal line connecting the start point (X=10, Y=20) with the end point (X=20, Y=20) is an outline portion constituting part of the stem. It is on the basis of such outline data that the graphic path of FIG. 24 is prepared.

Conventionally, stem width adjustment often involves duplicate movement of outline portions. For example, despite the fact that an outline portion b1 and an outline portion b2 in FIG. 21 constitute a continuous horizontal straight line, the two outline portions are separately moved. That is, the same point is moved twice (X=20, Y=20 in FIG. 21). This is detrimental to the efficiency of processing.

The same coordinates of a movable outline portion in a stem may be rewritten a plurality of times and the shape of the character still remains aligned provided that the stem is either horizontal or vertical. This is because the coordinates of the movable outline portion are simply rewritten until the target stem width is reached. On the other hand, a tilted stem requires that the coordinates of its movable outline portion be increased or decreased by a displacement corresponding to the amount of stem width adjustment. This means that if the same coordinates are rewritten a plurality of times for the tilted stem, the shape of the character comprising that stem can become misaligned.

To prevent this deficiency, the stem width adjusting unit 11 checks to see if the movable (i.e., adjustable) one of the pair of outline portions constituting a stem is identical in outline shape to another outline portion continuous therewith. If the two continuous outline portions are found to be identical in outline shape, the stem width adjusting unit 11 allows the two outline portions to be moved collectively.

Figure 27:
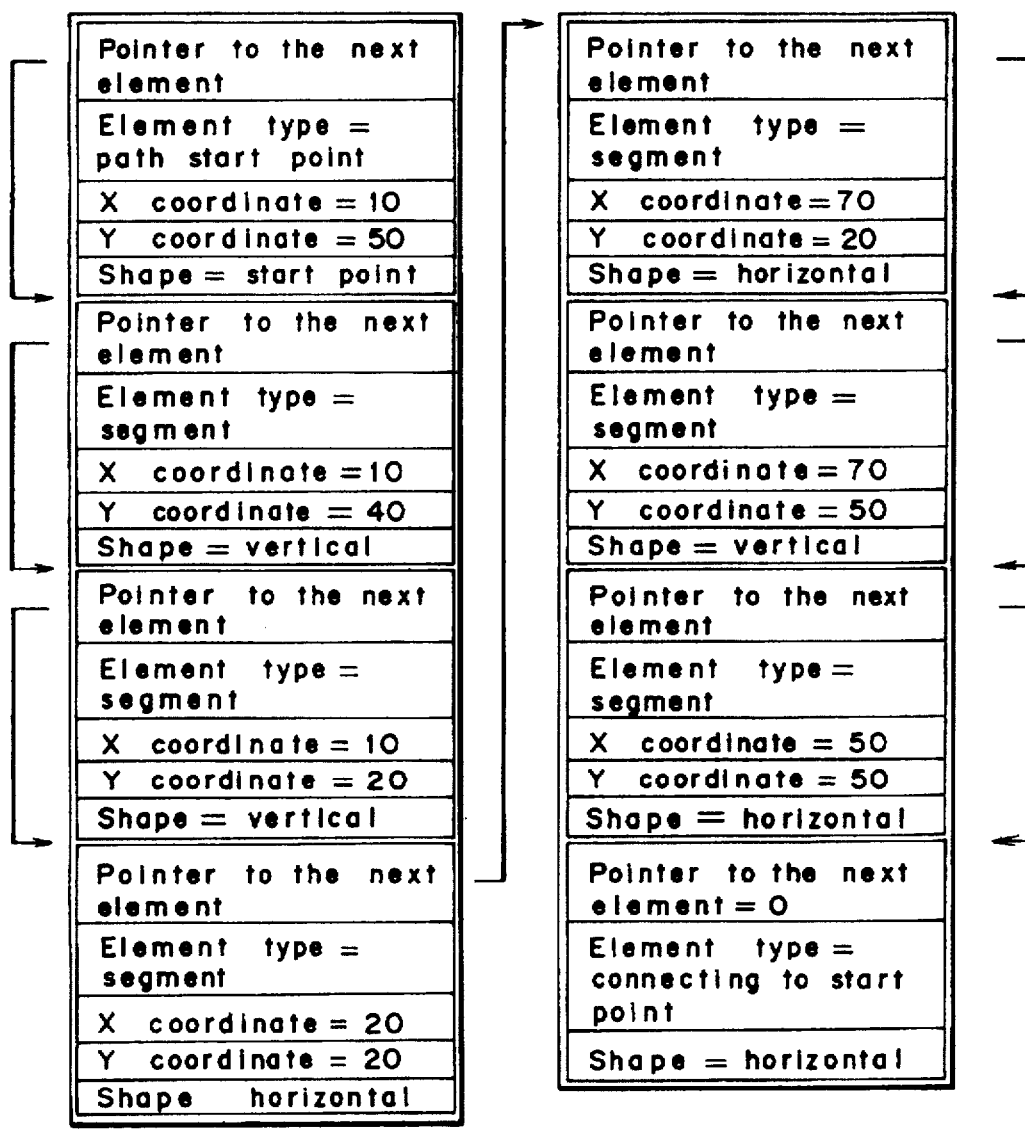
FIG. 27 is a view showing an improved graphic path.

More specifically, suppose that the outline data shown in FIGS. 25 and 26 are used to prepare the graphic path depicted in FIG. 27. FIGS. 25 and 26 show typical horizontal and vertical outline data, respectively. The outline data in this case include no data representing points as part of an unchanged outline shape. Such points are denoted only by the coordinates for each point of intersection between a horizontal and a vertical outline portion (e.g., point where X=70, Y=20 in FIG. 21). The coordinates of any intermediate points as part of an unchanged outline shape are omitted (e.g., point where X=20, Y=20 in FIG. 21).

As shown in FIG. 27, each of the path elements making up the graphic path has a shape data field in which to set outline shape data (specifying horizontal, vertical or tilted orientation). Each linear path element has one shape data field, as illustrated in FIG. 27. A curve path element, on the other hand, has two shape data fields because the outline shape of a curve generally differs between the start and the end point thereof, as shown in FIG. 28. Alternatively, a curve path element may have one shape data field in which two different items of shape data are mixedly set.

For stem width adjustment, each segment or curve represented by the outline data is first moved by the amount to be adjusted. Then the graphic path is traced in reverse by referencing the shape data in each of the path elements. The stem width is adjusted by successively moving the coordinates to each point where the outline shape is changed. In this manner, the stem width is adjusted without having to rewrite the same coordinates a plurality of times. This enhances the efficiency of the processing and prevents the misalignment of drawn characters as well. Because the quantity of necessary outline data is reduced, the burden of processing on the apparatus is also alleviated.

(7) Width Adjustment of Stem Handled in Real Number

In the above-described process of stem width adjustment, the amount of movement for the outline portions constituting each stem is given in integer. However, always expressing the amount of outline portion movement in integer can lead to problems with the balance of the drawn character. For example, some characters each have a linear stem continuous with a curve (including an alphabetic character "O" in which the whole stem is curved). Another example is a horizontal or vertical stem having been tilted after transformation (e.g., rotation) and adjusted in width. Such stems, when adjusted, can disrupt the entire balance of the character that is output and drawn.

Figure 29:
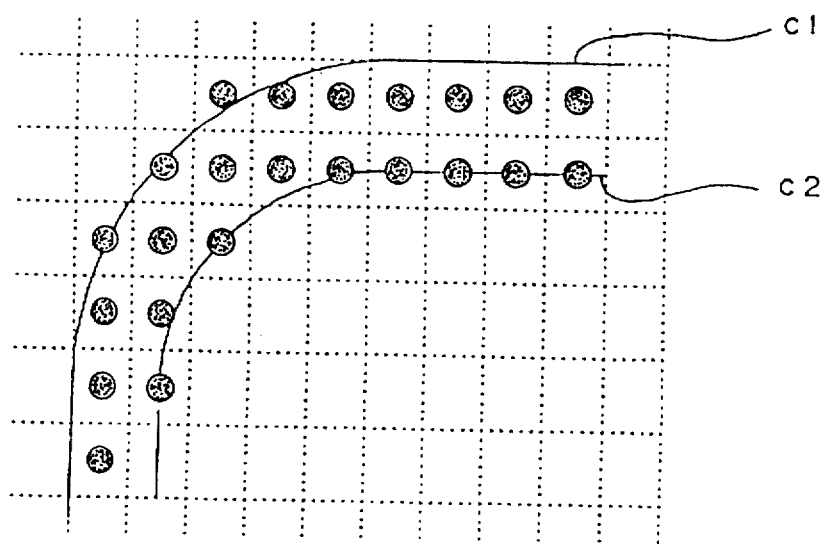
FIG. 29 is a view for explaining how the width of a curved stem is to be adjusted (before adjustment)
Figure 30:
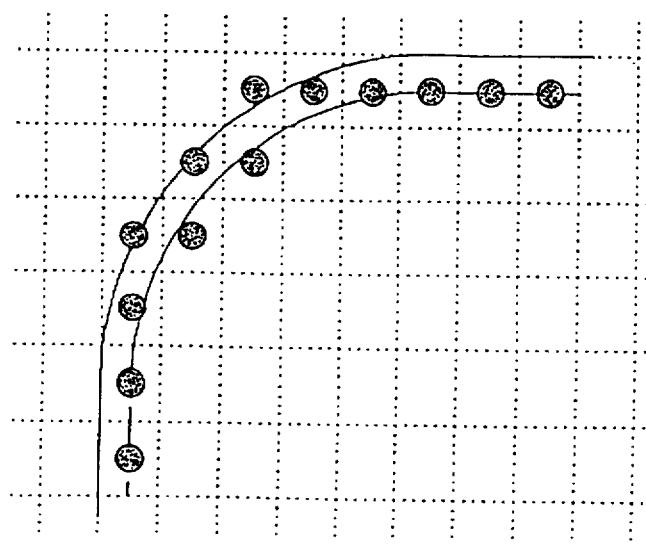
FIG. 30 is a view for explaining how the width of a curved stem is adjusted (after adjustment)
Figure 31:
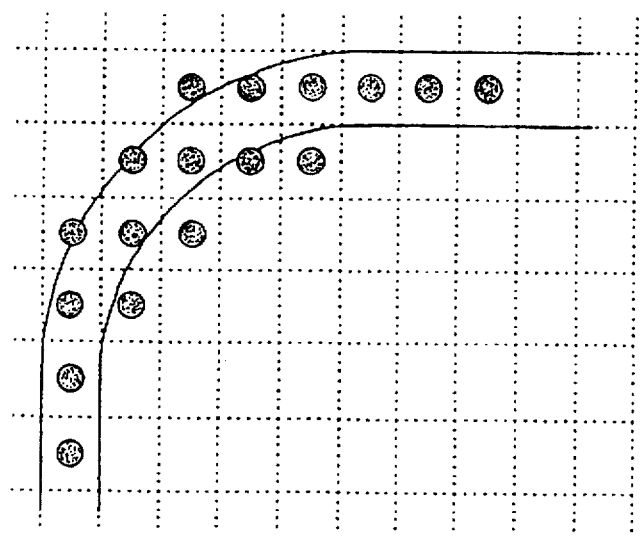
FIG. 31 is a view for explaining how the width of a curved stem is adjusted in an improved manner (after adjustment)

FIGS. 29 through 31 show an example in which a horizontal stem has its lower outline portion moved and a vertical stem has its right-hand side outline portion moved for stem width adjustment. What is displayed here is a set of pixels partially in common with those making up the region enclosed by one pair of outline portions (e.g., outline portions c1 and c2 in FIG. 29). The rounding rule used to calculate the actual stem width is one stipulating that fractions of the apparatus coordinates for the upper or right-hand side outline portion be raised to a whole number and that fractions of the apparatus coordinates for the lower or left-hand side outline portion be discarded. The rounding rule used to calculate the target stem width is one specifying that fractions of the coordinates be discarded.

The terms used in the description that follows are defined below. The actual stem width already used in the above description refers to an actual integer stem width because the stem width is rounded to an integer. An actual real number stem width refers to a real number width which is formed between the coordinates of the outline portions constituting a stem transformed from the character coordinate system to the apparatus coordinate system and which is perpendicular to the outline portions.

FIG. 29 shows a state before stem width adjustment. In FIG. 29, the actual real number stem width is 1.5 for both the horizontal and the vertical stem; the actual integer stem width is 2 and the target stem width is 1 for the two stems. These stems are subject to width adjustment as follows: in FIG. 30, the amount of movement is set for 1. In order to make the actual integer stem width coincide with the target stem width of 1 for both the horizontal and the vertical stems, the amount of 1 is subtracted from the actual integer stem width for both stems. With the stem width adjustment performed, the actual integer stem width is brought to 1. In this case, the actual real number stem width is 0.5 (=1.5−1.0).

In keeping with the stem width adjustment, the control points of the curve continuous with the moving outline portion (the lower outline portion in this example) are moved by the amount of movement which is 1. The result of the drawing in FIG. 30 indicates that with the amount of adjustment set for 1, the curve portion becomes narrower than the horizontal or vertical portion. This disturbs the total balance of the character. This deficiency is overcome by the stem width adjusting unit 11 carrying out the process described below. To facilitate the understanding of what is to be described, the terms used in the description (including some terms already used) will also be defined below.

An actual integer stem width (h') refers to the width which is formed between the rounded coordinates of the outline portions constituting a stem after transformation from the character coordinate system to the apparatus coordinate system and which is perpendicular to the outline portions, the width being expressed in pixel count after development into bit map format as per a predetermined development rule.

A target stem width (H) refers to the width which is formed between the coordinates of the outline portions constituting a stem in the character coordinate system, which is perpendicular to the outline portions, and which is rounded to an integer after transformation into the apparatus coordinate system. An actual real number stem width (h) refers to the width which is formed between the coordinates of the outline portions constituting a stem after transformation from the character coordinate system to the apparatus coordinate system and which is perpendicular to the outline portions, the width being of a real number.

The difference between the actual integer stem width h' and the target stem width H (h'-H) is regarded as a first correction value D. The difference between the actual real number stem width h and the actual integer stem width h' (h-h') is regarded as a second correction value d. The first correction value D is an integer, while the second correction value d is a real number (−1<d<+1). The stem width adjusting unit 11 first moves the coordinates of the movable outline portion in accordance with the X and Y components of the first correction value D in the apparatus coordinate system. The stem width adjusting unit 11 then moves the coordinates in accordance with the X and Y components of the second correction value d in the apparatus coordinate system.

Thereafter, the control points, in the apparatus coordinate system, of the curve continuous with the outline portion moved for stem width adjustment are moved in accordance with the X and Y components of the first correction value D in the apparatus coordinate system. The control points are then moved in keeping with the X and Y components of the second correction value d in the apparatus coordinate system. It may happen that as a result of the adjustment based on both the first correction value D and the second correction value d, the actual integer stem width h' fails to match the target stem width H. In that case, only the first correction value D is utilized for the adjustment; the second correction value d is not used. The broken line approximating unit 12 generates a curve that is approximated using broken lines based on the control points moved by the stem width adjusting unit 11.

In the case of FIG. 29, the first correction value D is 1 and the second correction value d is −0.5 because the actual integer stem width h' is 2, the target stem width H is 1 and the actual real number stem width h is 1.5. The amount of movement is 0.5 (D+d) whereby the stem width is adjusted and the control points are moved. After the adjustment, the actual integer stem width h' is 1 and the actual real number stem width h is 1.0 as well. The result of the drawing following the adjustment above is illustrated in FIG. 31.

As evident from the comparison of FIG. 30 with FIG. 31, the actual real number stem width for the horizontal and the vertical stem matches the target stem width in both cases. However, the curve portion in FIG. 31 is wider than its counterpart in FIG. 30. Viewed as a whole, the character in FIG. 31 appears balanced in terms of width in its horizontal, vertical and curved portions.

Because the second correction value d is a real number, there is little possibility of the value becoming 0 even though the value may approach 0 through calculation errors. If the above process is always carried out strictly as described, the movement of outline portions will have to be executed as long as the second correction value d is not 0 despite the fact that the first correction value D is 0. This leads to an increase in the burden of processing on the apparatus, resulting in a drop in the latter's performance.

This problem may be overcome as follows: an effective range of the second correction value d is defined beforehand in accordance with the resolution of the device on which to output characters (display unit, printer, etc.) and in keeping with the size of characters to be output. Whenever the effective range is exceeded, the second correction value d is regarded as 0 for the processing involved. For example, the effective range of the second correction value d may be d>0.25, d<−0.25 for a printer with a resolution of 600 dpi (dots per inch).

(8) Movement of Outline Portion in Consideration of Adjacent Stem

Generally, one of the pair of outline portions constituting each stem is previously determined to be movable for stem width adjustment. Alternatively, as discussed earlier, the flag setting unit 13 is used to move only the outline portion that has no history of movement. It may happen, however, that character parts may "fuse" when drawn depending on character design or drawing size.

Figure 32:
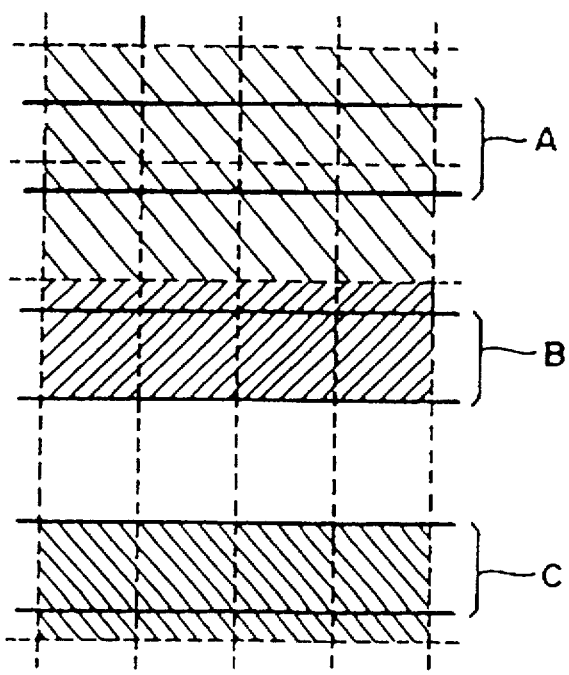
FIG. 32 is a view for explaining how the widths of stems are to be adjusted (before adjustment)
Figure 33:
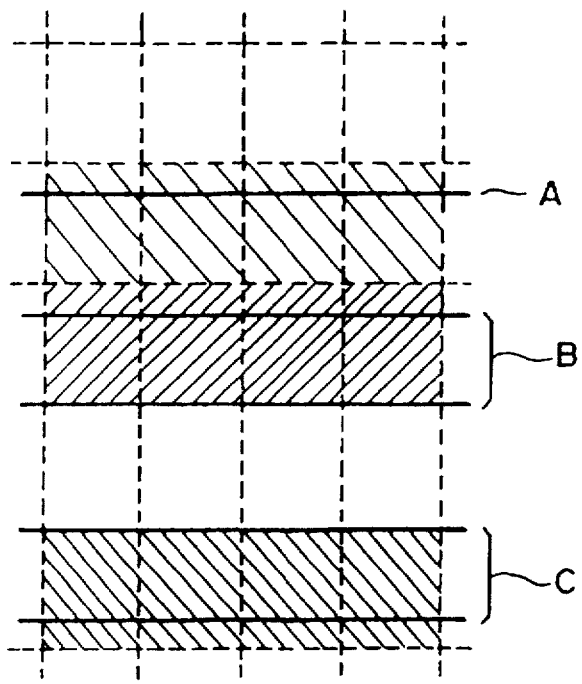
FIG. 33 is a view for explaining how the width of stems are adjusted (after adjustment)
Figure 34:
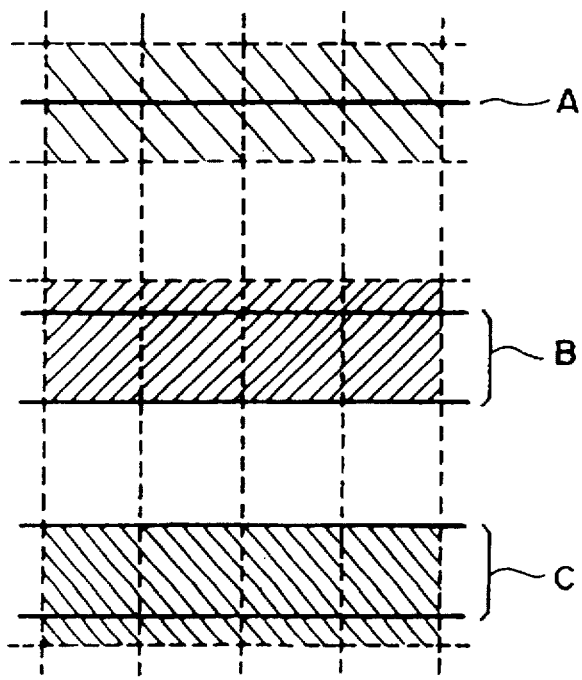
FIG. 34 is a view for explaining how the widths of stems are adjusted in an improved manner (after adjustment).

FIGS. 32 through 34 show an example of stem width adjustment involving fused character parts. What is displayed here is a set of pixels partially in common with those making up the region enclosed by one pair of outline portions. The rounding rule used to calculate the integer stem width is one stipulating that fractions of the apparatus coordinates for the upper or right-hand side outline portion be raised to a whole number and that fractions of the apparatus coordinates for the lower or left-hand side outline portion be discarded. The rounding rule used to calculate the target stem width is one specifying that fractions of the coordinates be rounded to the nearest whole number.

In this example, as shown in FIG. 32, stems A and B are fused (i.e., no space therebetween) prior to stem width adjustment. During stem width adjustment, the outline portion of one of the two stems is moved to remove the fusion. Which of the two stems has one of its outline portions moved determines whether or not the fusion can be resolved. FIG. 33 shows a case in which the upper outline portion of the stem A is moved close to its lower outline portion. The movement fails to eliminate the fused state.

This problem is circumvented by determining the outline portion to be moved for stem width adjustment as follows: the embodiment of the invention acquires a first and a second pixel count. The first pixel count is arranged to represent the distance between the target stem to be adjusted in width and a first parallel stem in parallel with the target stem; the second pixel count is arranged to correspond with the distance between the first parallel stem and a second parallel stem in parallel with and on the other side of the first parallel stem.

If the first pixel count is identical to the second pixel count, any one of the pair of outline portions constituting the target stem to be adjusted is moved. With the first pixel count found to be greater than the second pixel count, that outline portion of the target stem located on the side of the first parallel stem is moved if it is desired to widen the target stem, and that outline portion of the target stem located on the side of the second parallel stem is moved if it is desired to narrow the target stem.

With the first pixel count found to be smaller than the second pixel count, that outline portion of the target stem located on the side of the second parallel stem is moved if it is desired to widen the target stem, and that outline portion of the target stem located on the side of the first parallel stem is moved if it is desired to narrow the target stem. The above-described process of stem width adjustment applies only if neither of the outline portions constituting the stem has history of movement. The reason is that if any one of the pair of outline portions has been moved, the outline portion to be moved now for adjustment is uniquely determined, as discussed earlier in connection with the movement history flag.

It may happen that moving one of the pair of outline portions constituting the target stem results in an insufficient pixel count failing to represent the distance between the moved outline portion and the corresponding parallel stem. In that case, the width of the target stem is kept from being adjusted. When the outline portion to be moved is determined in the manner described, the fusion of character parts is eliminated. Where stem width adjustment would otherwise lead to the fusing of character parts, the scheme above prevents such fusion.

In FIG. 32, if the outline portion to be moved is determined as described, the lower outline portion of the stem A is moved close to its upper outline portion. This movement eliminates the fusion between the stem A and the stem B, as shown in FIG. 34. Although the example described above is one in which the stem width is narrowed through stem width adjustment, the scheme also applies where the stem width is to be widened.

As described and according to the invention, the quality of drawing is improved significantly for characters including those that have many curved parts or delicately tilted stems as well as those that are to be output in small sizes. In addition, the burden of processing on the outline character drawing apparatus is alleviated, and the speed of processing is enhanced.

As many apparently different embodiments of this invention may be made without departing from the spirit and scope thereof, it is to be understood that the invention is not limited to the specific embodiments thereof except as defined in the appended claims.

What is claimed is:

1. An outline character drawing apparatus comprising:
dictionary storage means for storing a plurality of outline data including a path forming operator for geometrically defining characters, a hint operator having as a parameter a stem range designating the positions of outline portions constituting a horizontal and a vertical stem, and a development rule operator having identifiers for designating development rules by which to develop geometrically expressed characters into bit map format, said development rules include a first development rule in which each pixel is to be located on a lattice point formed by coordinates and a second development rule in which each pixel is to be located between coordinates;
rule storage means for storing said first and second development rules designated by the identifiers;
coordinate transformation means for transforming said outline data in said dictionary storage means from a character coordinate system for defining characters into an apparatus coordinate system for drawing characters;
bit map development means for extracting from said rule storage means the development rules corresponding to the identifiers included in said outline data, said bit map development means further developing into bit map format the character expressed by the data processed by said coordinate transformation means, the developing process being executed in accordance with said development rules extracted from said rule storage means; and
stem width adjustment means for extracting in said character coordinate system a pair of outline portions constituting a stem which is part of a character, the extracting process being performed on the basis of said stem range represented by the hint operator of said outline data, said stem width adjustment means further transforming, from said character coordinate system to said apparatus coordinate system, the coordinates of said pair of outline portions constituting said stem, the transformed coordinates being rounded to integers so that the width formed between the rounded coordinates and perpendicular to said pair of outline portions is developed into bit map format according to said first and second development rules, said width being expressed in a pixel count based on said bit map format and regarded as an actual integer stem width, said stem width adjustment means further transforming into said apparatus coordinate system the width which is formed in said character coordinate system between the coordinates of said pair of outline portions constituting said stem and which is perpendicular to said pair of outline portions, the transformed width being rounded to an integer and regarded as a target stem width, wherein the difference between said actual integer stem width and said target stem width is taken as a first correction value providing the basis for moving in said apparatus coordinate system the coordinates of one of said pair of outline portions constituting said stem, whereby the width of said stem is adjusted.

2. An outline character drawing apparatus according to claim 1, wherein said stem width adjustment means forcibly sets to 1 said target stem width if said target stem width turns out to be 0.

3. An outline character drawing apparatus according to claim 1, further comprising flag setting means for setting a flag indicating whether any of the outline portions constituting said stem has been moved for stem width adjustment;
wherein said stem width adjustment means references said flag setting means so as to move, for stem width adjustment, the outline portion that has not been moved, and alters the flag representing the moved outlined portion so that said flag indicates that the corresponding output portion has been moved.

4. An outline character drawing apparatus according to claim 1, wherein said stem width adjustment means is activated if, when one of the outline portions constituting said stem is to be moved for stem width adjustment, another outline portion continuous with the current outline portion is found to have the same outline shape as that of said current outline portion, said stem width adjustment means thereupon moving collectively both said current outline portion and the outline portion continuous therewith.

5. An outline character drawing apparatus according to claim 1, further comprising broken line approximation means for generating a curve approximated in broken lines based on a plurality of control points included as parameters in a curve drawing operator;

wherein said outline data in said dictionary storage means include said curve drawing operator; and wherein said stem width adjustment means transforms, from said character coordinate system into said apparatus coordinate system, the coordinates of said pair of outline portions constituting said stem, the transformed coordinates forming a width therebetween, said width being perpendicular to said pair of outline portions and expressed in a real number to constitute an actual real number stem width, wherein the difference between said actual real number stem width and said actual integer stem width is taken as a second correction value providing the basis for further moving in said apparatus coordinate system the coordinates of the outline portion previously moved for stem width adjustment, wherein the control points in said apparatus coordinate system of the curve portion continuous with the moved outline portion are moved in accordance with said first and said second correction value; and wherein said broken line approximation means generates said curve portion approximated in broken lines based on said control points moved by said stem width adjustment means.

6. An outline character drawing apparatus according to claim 5, further comprising effective range storage means for storing an effective range of said second correction value, said effective range being determined in advance in accordance with the resolution of an output device used for character output and with the size of characters to be output;

wherein said stem width adjustment means regards said second correction value as 0 if said second correction value is outside said effective range stored in said effective range storage means.

7. An outline character drawing apparatus according to claim 1, wherein said stem width adjustment means acquires a first and a second pixel count, said first pixel count corresponding to the distance between the target stem to be adjusted for stem width adjustment and a first parallel stem in parallel with said target stem, said second pixel count corresponding to the distance between said first parallel stem and a second parallel stem in parallel with and on the opposite side of said first parallel stem;

wherein, with said first pixel count found to be greater than said second pixel count, that outline portion of said target stem located on the side of said first parallel stem is moved if it is desired to widen said target stem, and that outline portion of said target stem located on the side of said second parallel stem is moved if it is desired to narrow said target stem; and wherein, with said first pixel count found to be smaller than said second pixel count, that outline portion of said target stem located on the side of said second parallel stem is moved if it is desired to widen said target stem, and that outline portion of said target stem located on the side of said first parallel stem is moved if it is desired to narrow said target stem.

8. An outline character drawing apparatus according to claim 7, wherein said stem width adjustment means does not adjust the width of said target stem if moving one of the pair of outline portions constituting said target stem results in an insufficient pixel count failing to represent the distance between the moved outline portion and the corresponding parallel stem.

* * * * *